Oct. 20, 1936.　　　　F. E. STAHL　　　　2,057,928

METHOD OF CUTTING V-SHAPED ENDS ON CHAIN LINK BLANKS

Filed July 6, 1935

OLD FORM

Inventor,
FRANK E. STAHL by

Attorney.

Patented Oct. 20, 1936

2,057,928

UNITED STATES PATENT OFFICE 2,057,928

METHOD OF CUTTING V-SHAPED ENDS ON CHAIN LINK BLANKS

Frank E. Stahl, Tonawanda, N. Y., assignor to Columbus McKinnon Chain Corporation, Tonawanda, N. Y., a corporation of New York Application July 6, 1935, Serial No. 30,179

7 Claims. (Cl. 164—17)

My invention relates generally to the formation of blanks for chain links, and in particular to the formation of the ends of the blanks which are to be made into links that are subsequently welded.

I have discovered that the formation of gas pockets and the inclusion of foreign matter, usually found in welded chain links having substantially straight faces, may be avoided and a substantially perfect welded joint obtained by making the ends of the blank which is to form the link of V-shaped formation. When a link having such ends is welded, the welding of the metal starts at a point midway the width or diameter of the stock and progressively travels outwardly in opposite directions from the center, until the full cross-sectional area of the stock has been welded; the end portions of the blank, as the joint is being welded, being progressively moved toward each other to compensate for the shortening of the metal during the welding process. This method of welding is clearly disclosed in United States Letters Patent No. 2,021,157 issued to me on November 19, 1935, upon a Method of welding.

When, however, chain link blanks are provided with such V-shaped ends, it is necessary that the angle be maintained within close limits in order that a successful weld may be made. Such angle may vary slightly according to the particular stock being cut. The preferable way of forming chain link blanks having V-shaped ends is to cut or pinch them from the stock by the use of two V-shaped cutters which are moved toward each other and forced into the material. I have found, however, that the angle which the cut side of the blank makes with the axis of the blank is slightly less than the angle which is the complement of the angle which the cutting side of the cutter makes with its axis. In other words, the angle which the cut surface of the blank makes with its axis when the cutting is completed is slightly less than the angle which the face of the cutter makes with the axis of the blank. If the included angle of the faces of the cutter is, therefore, made to give the desired included angle of the V-shaped end of the blank, the resulting included angle of the V-shaped end is slightly less than that which was intended.

The principal object of my invention has, therefore, been to compensate for this variation of angle of the cut surface so that the finished blank shall have the proper welding angle when it is severed from the stock from which it is cut.

Another object has been to provide stepped surfaces on the cutters which shall thus form teeth to grip the surfaces being cut and thereby tend to hold them more truly to the desired angle.

Moreover, my method of cutting provides surfaces which aid materially in the welding of the ends of a chain link blank.

In the accompanying drawing, I have shown a chain link blank cut in accordance with my invention and a pair of cutters for carrying out the method. In the drawing.

Figure 7:
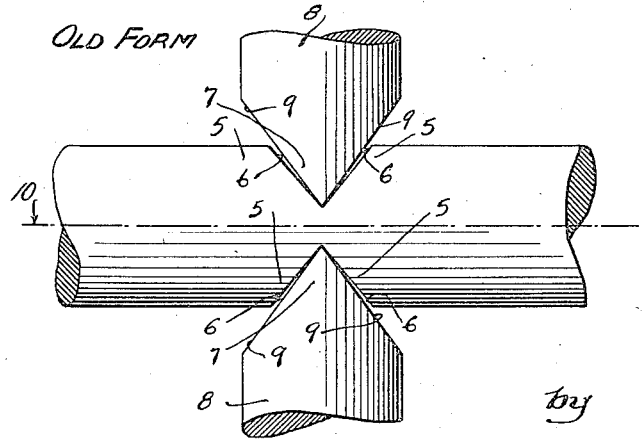
Fig. 7 shows enlarged, smooth-sided cutters of old form in the act of cutting a blank, showing the increase in angle of the V-shaped surfaces of the blank over that of the cutters.

In the severing of metal by the use of V-shaped cutters, as shown in Fig. 7 (which illustrates the present method of cutting and more clearly contrasts the principle upon which my method is based), it will be obvious that the metal is compressed in the portions 5 which lie immediately back of the surface 6 due to the increasing width of the V-shaped ends 7 of the cutter 8. When the cutters first start to sever the blank, the compression of the metal in the portion 5 will first occur and will increase considerably because the metal in the solid uncut portion of the stock between two opposite cutters is relatively great in its cross-sectional area. As the cutters 8 are forced into the metal, such compressive action will, of course, continue to increase and during such action there is a slight elongation of the metal in the uncut portion. Such elongation may be slight until a point in the cutting action is reached where the compression is so much greater than the tensile strength of the uncut metal that such metal will rapidly elongate. The gap formed by the cutting tool is accounted for by the compressive action of the tool upon the metal in the portions 5 and also by some slight elongation, the amount of elongation being equal to the difference between the width of the gap and the amount of movement due to compression of the metal. If this difference is less than the total elongation of the specimen at any period during the cutting action, it will be seen that the surfaces 6 of the blank will be drawn away from the angular surfaces 9 of the cutter. This action, of course, does not occur all at once but is accomplished gradually by the tool as it is being forced down into the stock. The result of this action is that the inclination of the surfaces 6 with the axis 10 of the stock is slightly less than the angle which the inclined surfaces 9 of the cutter make with the same axis, with the result that the included angle between the sides 6 of the blank is not the same as that originally intended when the included angle of the surfaces 9 of the cutters were originally formed. As a result of this condition, if the included angle of the sides of the cutter are made to produce the desired angle upon the V-shaped ends of the blank, the blank will have a different angle. Since it is essential in the welding of chain links having V-shaped ends that the angle be exact, I have found it necessary to employ other means in order to insure that the included angle of the point of the finished blank will be correct for welding.

Figure 1:
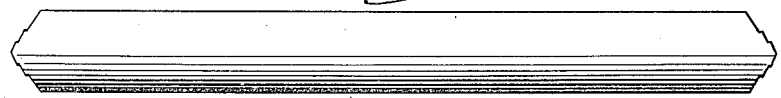
Fig. 1 shows a chain link blank having V-shaped ends, cut by my method.
Figure 2:
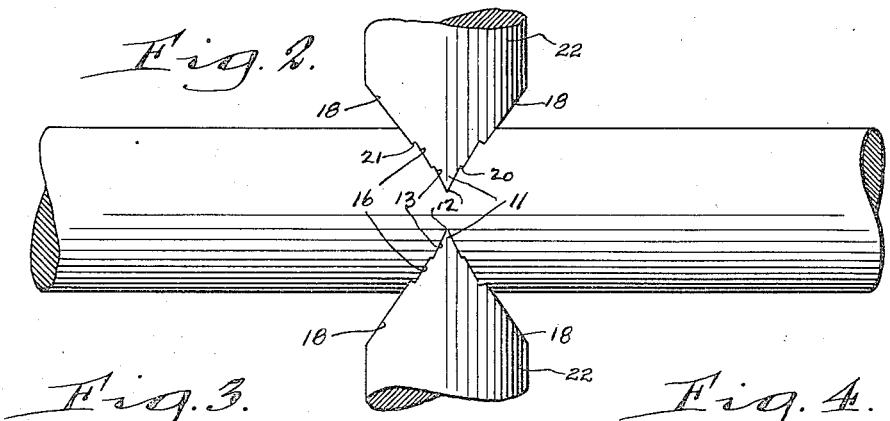
Fig. 2 shows enlarged cutters in the act of cutting the blank in accordance with the steps of my invention.

I have found that this variation in angle may be compensated for by providing the cutters with a series of faces of different angles, whereby, as the blank is being severed, a succession of angularly arranged faces will be presented in the formation of the V-shaped end thereof. Such cutters are shown in Figs. 3 to 6. In addition to the faces at different angles, the cutters may have these faces arranged in stepped manner. Such a cutter is shown in the preferred form of Fig. 3. As here shown, each cutter 22 is provided with an extreme end 11 having a cutting edge 12 from which extend cutter faces 13, each arranged at a definite angle 14 with the axis 15 of the cutter. Behind each of the faces 13 is provided a face 16 which is slightly raised above the face 13 at the end thereof by the provision of a step 20, and each of these faces is arranged at an angle 17 with the axis which is slightly greater than the angle 14. Faces 18 are also provided behind the faces 16, each of which is also raised slightly above the faces 16 by the provision of a step 21, and each of these faces is arranged at an angle 19 with the axis 15 of the blank which is slightly greater than the angle 17. It will be seen, therefore, from Fig. 2, that if these tools are forced into the stock, the gap shown in Fig. 7 which results from the use of a V-shaped cutter having flat sides, is compensated for by the faces 16 and 18 as they enter the V-shaped opening between the portions of the stock which are initially made by the faces 13 at the end 11.

I have further found that the formation of the steps 20 between the faces 13 and 16 and the steps 21 between the faces 16 and 18 act somewhat as teeth upon the metal over the cut surface, and since these are arranged at right angles to the faces 16 and 18, they serve somewhat to hold the metal against elongation and to correct to a slight degree at least the defects of a cutter 8 of the type shown in Fig. 7.

It will be obvious, therefore, that since the faces 16 and 18 compensate for the variation of the angle above described, and since the stepped surfaces 20 and 21 act as teeth upon the surfaces of the stock being cut, the cutter may be made to have the correct combination of angles for proper welding with the assurance that the angles of the finished blank will run true to the original design of the cutter. Not only does the angular arrangement of the cutter faces make it possible to produce blanks formed with V-shaped ends having the correct angles, but the welding of the blank is greatly improved because of such angular face formation, and particularly is this true when the blanks are cut with cutters having the stepped formation like that of Figs. 2 and 3.

Figure 3:
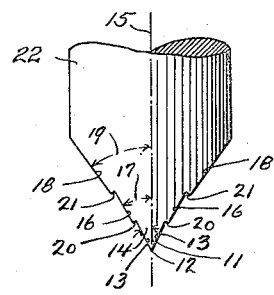
Fig. 3 is an enlarged, side elevation of one of the cutters used in my method.
Figure 4:
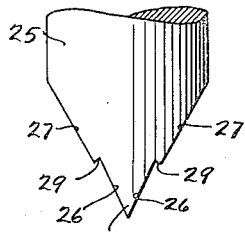
Fig. 4 shows a slightly modified form of cutter of the type shown in Fig. 3.

Referring now particularly to Fig. 4, substantially the same advantages may be derived by the use of a cutter 25, shown in this figure. This cutter is provided with but two faces 26 and 27 at each side of the central axis of the cutter, the faces 26 being formed on the end 28 of the cutter. This cutter is similar to the cutter of Fig. 3 in that it is provided with a step 29 arranged between each of the adjacent faces 26 and 27. Like the cutter of Fig. 3, this cutter has its faces 26 arranged at an angle with the axis which is more acute than the angle which the faces 27 make with such axis.

Figure 5:
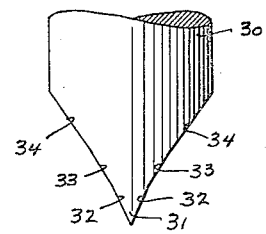
Fig. 5 is an enlarged, side elevation of another modified form of cutter.
Figure 6:
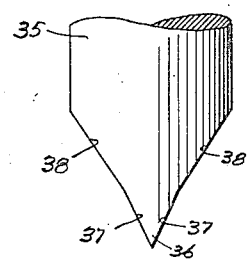
Fig. 6 is a modified form of cutter of the type shown in Fig. 5.

While the stepped arrangement of the faces of the cutters of Figs. 3 and 4 provide teeth which aid somewhat in the prevention of the elongation of the material as it is being cut, the teeth provided by such stepped arrangement may be dispensed with and some of the beneficial results of my invention derived by the use of angularly arranged cutter faces meeting and joining each other in the same planes, as shown in Figs. 5 and 6. In the form of Fig. 5, the cutter 30 is formed with an end 31 having its faces 32 meeting and joining the faces 33 in the same planes. Furthermore, in similar manner, the faces 34 meet and join the faces 33 in the same planes. Like in the form of invention of Fig. 3, the faces 32, 33, and 34 on each side of the axis of the blank are each successively arranged at an increased angle with the axis of the blank.

In the cutter 35 shown in Fig. 6, the end 36 is formed by angularly arranged faces 37, each of which meet and join the angularly arranged faces 38 in the same planes, the faces 38 being arranged at a greater angle to the axis of the blank than the faces 37, in similar manner to the form of invention shown in Fig. 4.

When severing a blank by the use of cutters such as those shown in Figs. 5 and 6, the spreading angle of the cut surfaces of the stock will be compensated for by the successive application of the angularly arranged faces 32, 33, and 34 of Fig. 5, or 37 and 38 of Fig. 6 and the finished end of the blank made to have the desired angular formation.

Obviously, these and other modifications of the details herein shown and described may be made without departing from the spirit of my invention or the scope of the appended claims, and I do not, therefore, wish to be limited to the exact embodiment herein shown and described, the forms shown being merely preferred embodiments thereof.

Having thus described my invention, what I claim is:

1. A method of cutting V-shaped ends on chain link blanks, comprising initially forcing the points of V-shaped cutters into the blank stock from opposite sides thereof, and then retarding elongation of the uncut portion of the metal of the stock by subjecting the surfaces of the blank stock on each side of the cutter to toothed, cutter surfaces.

2. A method of cutting V-shaped ends on chain link blanks, comprising initially forcing the points of V-shaped cutters into the blank stock from opposite sides thereof, and then retarding elongation of the uncut portion of the metal of the stock by subjecting the surfaces of the blank stock on each side of the cutter to stepped, toothed, cutter surfaces.

3. A method of cutting V-shaped ends on chain link blanks comprising the forcing of two oppositely arranged V-shaped cutters into the metal and compensating for the variation in angle between the sides of the cut by progressively presenting, to such cuts, surfaces having a progressively increasing angle.

4. A method of cutting V-shaped ends on chain link blanks comprising the forcing of two oppositely arranged V-shaped cutters into the metal, and progressively engaging the cut surfaces of the metal with stepped, tooth-shaped surfaces, whereby elongation of the metal is minimized.

5. A method of cutting V-shaped ends on chain link blanks, comprising initially forcing the ends of V-shaped cutters into the blank stock from opposite sides thereof, and then subjecting the stock to a series of cutter faces arranged in pairs and located behind each end.

6. A method of cutting V-shaped ends on chain link blanks, comprising initially forcing the ends of V-shaped cutters into the blank stock from opposite sides thereof, and then completing the formation of the surfaces of the V-shaped ends of the stock by subjecting them to a series of cutter faces arranged in pairs and located behind each point, the angle which each of the faces of each pair of cutter faces makes with the axis of the cutter being successively greater than the angle of the preceding cutter face.

7. A method of cutting V-shaped ends on chain link blanks, comprising initially forcing the ends of V-shaped cutters into the blank stock from opposite sides thereof, and then subjecting the stock to cutter faces located behind each cutter end.

FRANK E. STAHL.